US009554320B2

(12) United States Patent
Yamamoto et al.

(10) Patent No.: US 9,554,320 B2
(45) Date of Patent: Jan. 24, 2017

(54) MOBILE COMMUNICATION SYSTEM, MOBILE COMMUNICATION METHOD, MOBILE STATION, PROGRAM, AND RECORDING MEDIUM (71) Applicant: MITSUBISHI HEAVY INDUSTRIES, LTD., Tokyo (JP)

(72) Inventors: Syusaku Yamamoto, Tokyo (JP); Masatoshi Tominaga, Tokyo (JP); Shinichi Hayashi, Tokyo (JP); Yutaka Miyajima, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/428,973

(22) PCT Filed: Jul. 3, 2013

(86) PCT No.: PCT/JP2013/068210
§ 371 (c)(1),
(2) Date: Mar. 17, 2015

(87) PCT Pub. No.: WO2014/050247
PCT Pub. Date: Apr. 3, 2014

(65) Prior Publication Data
US 2015/0249948 A1    Sep. 3, 2015

(30) Foreign Application Priority Data

Sep. 25, 2012  (JP) ................................ 2012-211135

(51) Int. Cl.
*H04W 36/30*     (2009.01)
*B60L 15/40*     (2006.01)
(Continued)

(52) U.S. Cl.
CPC .............. *H04W 36/30* (2013.01); *B60L 15/40* (2013.01); *B61L 15/0027* (2013.01);
(Continued)

(58) Field of Classification Search
CPC .... H04W 36/24; H04W 36/165; H04W 36/30; H04W 36/32; H04W 88/02; H04W 88/08
(Continued)

(56) References Cited

U.S. PATENT DOCUMENTS

2009/0232096 A1* 9/2009 Taniuchi ............... H04W 36/08
370/331

FOREIGN PATENT DOCUMENTS

JP    2-171039 A    7/1990
JP    5-199167 A    8/1993
(Continued)

OTHER PUBLICATIONS

International Search Report mailed Sep. 3, 2013, corresponding to International application No. PCT/JP2013/068210.
(Continued)

*Primary Examiner* — Sam Bhattacharya
(74) *Attorney, Agent, or Firm* — Kanesaka Berner & Partners, LLP (57) ABSTRACT A mobile communication system includes a mobile station provided in a moving object moving along a predetermined route, and a plurality of base stations provided along the route. The mobile station includes an interruption time determining unit that determines whether an interruption time, in which the base station communicating with the mobile station which is currently connected is interrupted communication with the mobile station, is within a predetermined permissible time range for a travel direction side of the route more forward than a current position of the moving object, and a handover processing unit that performs han-
(Continued)

dover processing when the interruption time determining unit determines that the interruption time is not within the permissible time range.

8 Claims, 4 Drawing Sheets

(51) Int. Cl.
  *B61L 27/00* (2006.01)
  *B61L 15/00* (2006.01)
  *H04W 36/24* (2009.01)
  *H04L 29/06* (2006.01)
  *H04W 36/16* (2009.01)
  *H04W 36/32* (2009.01)
  *H04W 88/02* (2009.01)
  *H04W 88/08* (2009.01)
  *H04W 84/00* (2009.01)

(52) U.S. Cl.
  CPC .......... *B61L 27/0005* (2013.01); *H04L 69/28* (2013.01); *H04W 36/165* (2013.01); *H04W 36/24* (2013.01); *B60L 2200/26* (2013.01); *B60L 2240/80* (2013.01); *H04W 36/32* (2013.01); *H04W 84/005* (2013.01); *H04W 88/02* (2013.01); *H04W 88/08* (2013.01); *Y02T 90/16* (2013.01)

(58) Field of Classification Search
  USPC .................................. 455/436–442; 370/331
  See application file for complete search history.

(56) References Cited

FOREIGN PATENT DOCUMENTS

| | | |
|---|---|---|
| JP | 10-32535 A | 2/1998 |
| JP | 10-89984 A | 4/1998 |
| JP | 2001-95030 A | 4/2001 |
| JP | 2002-165253 A | 6/2002 |
| JP | 3451543 B2 | 9/2003 |
| JP | 2005-244726 A | 9/2005 |
| JP | 2007-81499 A | 3/2007 |
| JP | 2008-99233 A | 4/2008 |
| WO | 2005/094110 A1 | 2/2008 |

OTHER PUBLICATIONS

Written Opinion mailed Sep. 3, 2013, corresponding to International application No. PCT/JP2013/068210.

Notice of Allowance in JP Application No. 2012-211135, mailed Aug. 9, 2016.

\* cited by examiner

| ACCESS POINT ID | SECTION CORRESPONDING TO COMMUNICATION RANGE R | SECTION IN WHICH SHADOWING OCCUR |
|---|---|---|
| AP0001 | P1~P2 | P9~P10 |
| AP0002 | P3~P4、P3~P5 | P11~P12 |
| AP0003 | P6~P7、P6~P8 | - |
| ⋮ | ⋮ | ⋮ |

MOBILE COMMUNICATION SYSTEM, MOBILE COMMUNICATION METHOD, MOBILE STATION, PROGRAM, AND RECORDING MEDIUM

RELATED APPLICATIONS

The present application is a National Phase of International Application Number PCT/JP2013/068210, filed Jul. 3, 2013, and claims priority of Japanese Patent Application No. 2012-211135, filed Sep. 25, 2012.

TECHNICAL FIELD

The present invention relates to a mobile communication system, a mobile communication method, a mobile station, a program, and a recording medium. Particularly, the present invention relates to a mobile communication system in which a mobile station moves while performing handover, a mobile communication method, a mobile station provided in a moving object moving along a predetermined route, a program causing a computer to serve as the mobile station, and a recording medium recording the program.

BACKGROUND ART

A next generation streetcar system is a next generation track transportation system. In the next generation streetcar system, radio communication is performed between a mobile station provided in a train and base stations provided along a track. In this case, multiple base stations are provided along the track. Therefore, when the train travels along the track, the mobile stations continuously perform communication by performing handover for, for example, a base station having the best radio wave reception state among the plurality of base stations.

When there is a structure such as a station building or a tall building between the track and the base station, since a radio wave reception state on the train rapidly deteriorates due to the influence of shadowing, there is a case in which communication is interrupted. For example, when communication is interrupted for several seconds, it is probable that a critical problem such as frame drop or frame freeze occurs in image transmission and the like in which real-time property is required.

Various technologies associated with such a background have been known (for example, refer to Patent Literature 1).

For example, Patent Literature 1 discloses a wireless train control system in a railway security system, which performs switching operation for a ground-based wireless transmission apparatus when a train moves during communication. In more detail, in the train control system, a handover point, which is a point at which an on-board wireless transmission apparatus changes the ground-based wireless transmission apparatus serving as a communication destination, is stored in a ground control apparatus. The train control system determines whether the train approaches the handover point based on position information transmitted by the train. When the train control system determines that the train approaches the handover point, the train control system reserves in advance a communication channel for communicating with the ground-based wireless transmission apparatus serving as the next communication destination of the train in communication with the ground control apparatus. In this way, according to the train control system, it is possible to reliably reserve a communication channel regardless of the influence of a change in the strength and the like of a radio wave due to a peripheral environment.

CITATION LIST

Patent Literature

[Patent Literature 1]
Japanese Patent (Granted) Publication No. 3451543

SUMMARY OF INVENTION

Technical Problem

In the train control system disclosed in Patent Literature 1, data necessary for performing a handover process is received from a base station during communication. However, a communication state with a base station is not always good. Therefore, according to the train control system disclosed in Patent Literature 1, it is not always possible to receive necessary data at a timing at which a communication state is good, so it is probable that an appropriate timing at which handover is to be performed will be missed.

Solution to Problem

According to the first aspect of the present invention, a mobile communication system in which a mobile station moves while performing handover includes a mobile station provided in a moving object moving along a predetermined route and a plurality of base stations provided along the predetermined route, wherein the mobile station includes an interruption time determining unit that determines whether an interruption time, in which the base station communicating with the mobile station which is currently connected is interrupted communication with the mobile station, is within a predetermined permissible time range for a travel direction side of the route more forward than a current position of the moving object and a handover processing unit that performs handover processing when the interruption time determining unit determines that the interruption time is not within the permissible time range.

The mobile station may include an interruption time calculating unit that calculates the interruption time, in which the base station communicating with the mobile station which is currently connected is interrupted communication with the mobile station, for the travel direction side of the route more forward than the current position of the moving object, and the interruption time determining unit may determine whether the interruption time calculated by the interruption time calculating unit is within the predetermined permissible time range.

The mobile station may include a current position calculating unit that calculates the current position of the moving object in the predetermined route, and the interruption time calculating unit may calculate the interruption time, in which the base station communicating with the mobile station which is currently connected is interrupted communication with the mobile station, for the travel direction side of the route more forward than the current position calculated by the current position calculating unit.

The mobile station may include a communication connection time calculating unit that calculates respective communication connection times, for which communication connection is continued when being performed handover, with respect to one or more base stations which is capable of performing handover, and the handover processing unit may perform handover processing for an base station having a longest communication connection time calculated by the communication connection time calculating unit among the one or more base stations which is capable of performing handover.

According to the second aspect of the present invention, a mobile communication method in which a mobile station moves while performing handover includes: an interruption time determining step that a mobile station provided in a moving object moving along a predetermined route determines whether an interruption time, in which the base station communicating with the mobile station which is a currently connected among a plurality of base stations provided along the route is interrupted communication with the mobile station, is within a predetermined permissible time range for a travel direction side of the route more forward than a current position of the moving object; and a handover processing step of performing handover processing when it is determined in the interruption time determining step that the interruption time is not within the permissible time range.

According to the third aspect of the present invention, a mobile station provided in a moving object moving along a predetermined route includes an interruption time determining unit that determines whether an interruption time, in which the base station communicating with the mobile station which is currently connected among a plurality of base stations provided along the predetermined route is interrupted communication with the mobile station, is within a predetermined permissible time range for a travel direction side of the route more forward than a current position of the moving object; and a handover processing unit that performs handover processing when the interruption time determining unit determines that the interruption time is not within the permissible time range.

According to the fourth aspect of the present invention, a program, which causes a computer to serve as a mobile station provided in a moving object moving along a predetermined route, causes the computer to serve as an interruption time determining unit that determines whether an interruption time, in which a base station communicating with the mobile station which is currently connected among a plurality of base stations provided along the predetermined route is interrupted communication with the mobile station, is within a predetermined permissible time range for a travel direction side of the route more forward than a current position of the moving object, and a handover processing unit that performs handover processing when the interruption time determining unit determines that the interruption time is not within the permissible time range.

According to the fifth aspect of the present invention, a recording medium, which records a program that causes a computer to serve as a mobile station provided in a moving object moving along a predetermined route, records the program that causes the computer to serve as an interruption time determining unit that determines whether an interruption time, in which a base station communicating with the mobile station which is currently connected among a plurality of base stations provided along the predetermined route is interrupted communication with the mobile station, is within a predetermined permissible time range for a travel direction side of the route more forward than a current position of the moving object, and a handover processing unit that performs handover processing when the interruption time determining unit determines that the interruption time is not within the permissible time range.

In the overview of the invention, all necessary features of the present invention are not enumerated. Subcombinations of these feature groups may also be an invention.

Advantageous Effects of Invention

Apparent from the above description, according to the aforementioned aspects, when communication interruption beyond a permissible time range is assumed regardless of a communication state with a connected base station, it is possible to perform a handover process at an appropriate timing.

DESCRIPTION OF EMBODIMENTS

Hereinafter, the present invention will be described through an embodiment of the invention; however, the following embodiment does not limit the invention according to the scope of claims, and all combinations of features described in the embodiment are not necessary for solutions of the invention.

Figure 1:
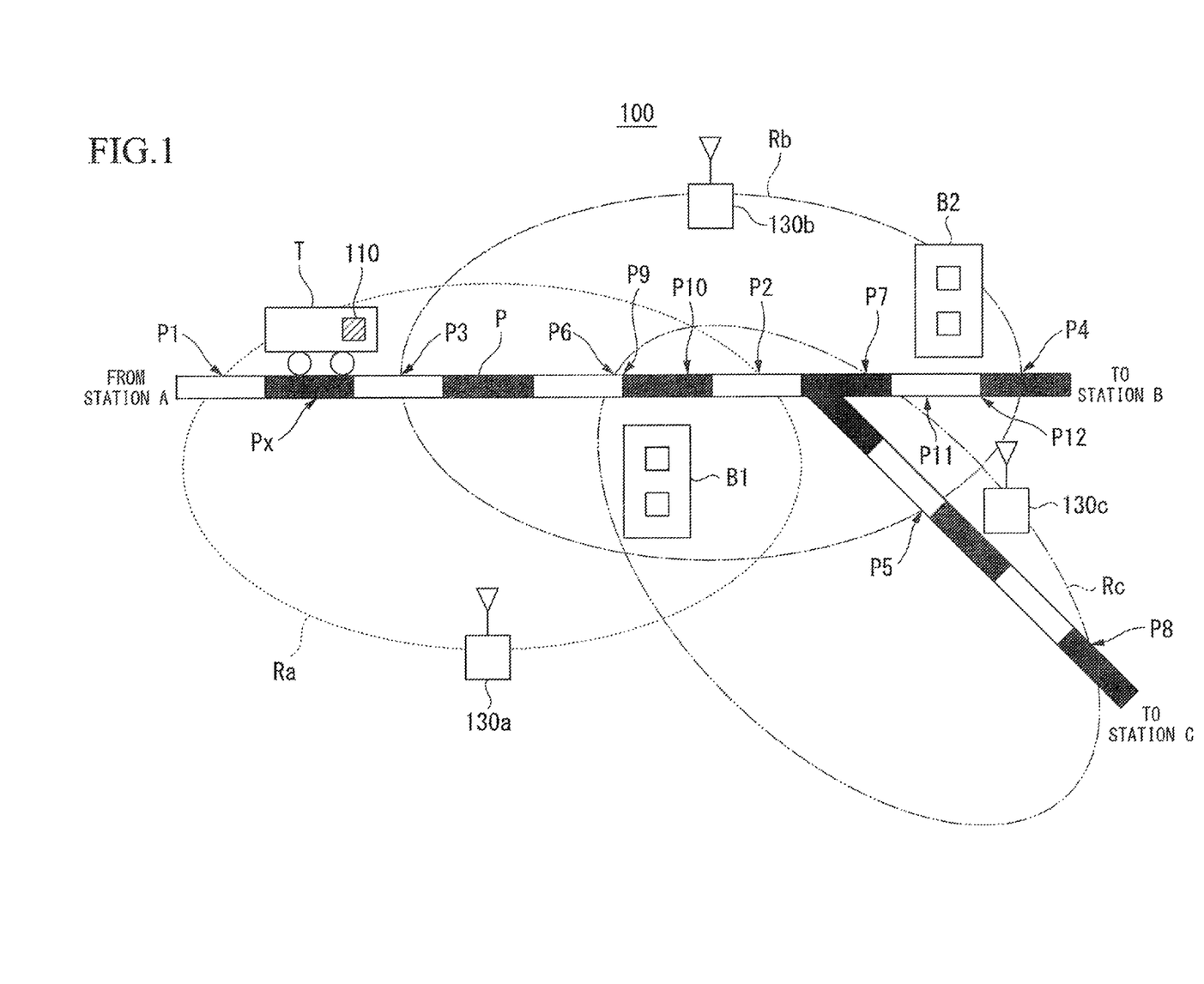
FIG. 1 is a diagram showing one example of a use environment of a mobile communication system 100 according to one embodiment.

FIG. 1 shows one example of a use environment of a mobile communication system 100 according to one embodiment. The mobile communication system 100 is a system in which a wireless LAN (local area network) terminal 110 moves while performing handover. The mobile communication system 100 includes a plurality of access points 130a, b, c, . . . (hereinafter, generically referred to as an access point 130) in addition to the wireless LAN terminal 110. The handover indicates that the wireless LAN terminal 110 switches to another access point 130 to be connected. The wireless LAN terminal 110 may also be one example of a "mobile station" in the invention. The access point 130 may also be one example of a "base station" in the invention.

The wireless LAN terminal 110 is provided in a train T. The train T is a vehicle that travels on a track P. The train T may also be one example of a "moving object" in the invention. The track P may also be one example of a "predetermined route" in the invention. The traveling on the track P may also be one example of "moving along the predetermined route" in the invention.

The access point 130 is provided along the track P. The access point 130 has a predetermined communication range R. In the case of the example, the access point 130a has a predetermined communication range Ra. Similarly, the access point 130b has a communication range Rb. Similarly, the access point 130c has a communication range Rc.

Consequently, the wireless LAN terminal 110 can perform communication connection with the access point 130 only in a predetermined section of the track P corresponding to the communication range R of the access point 130. In the case of the example, the wireless LAN terminal 110 can perform communication connection with the access point 130a only in a section from points P1 to P2 of the track P corresponding to the communication range Ra of the access point 130a. Similarly, in the case of moving from a station A to a station B, the wireless LAN terminal 110 can perform communication connection with the access point 130b only in a section from points P3 to P4 of the track P corresponding to the communication range Rb of the access point 130b. Similarly, in the case of moving from the station A to a station C, the wireless LAN terminal 110 can perform communication connection with the access point 130b only in a section from the point P3 to a point P5 of the track P corresponding to the communication range Rb of the access point 130b. Similarly, in the case of moving from the station A to the station B, the wireless LAN terminal 110 can perform communication connection with the access point 130c only in a section from points P6 to P7 of the track P corresponding to the communication range Rc of the access point 130c. Similarly, in the case of moving from the station A to the station C, the wireless LAN terminal 110 can perform communication connection with the access point 130c only in a section from the point P6 to a point P8 of the track P corresponding to the communication range Rc of the access point 130c.

When there is a structure B such as a station building or a tall building between the access point 130 and the track P, there is a case in which a radio wave from the access point 130 is blocked by the structure B, causing shadowing in a partial section on the track P, so that it is not possible to perform communication connection with the access point 130. In the case of the example, it is assumed that a radio wave from the access point 130a is blocked by a structure B1, causing shadowing in a section from points P9 to P10 of the track P, so that it is not possible to perform communication connection with the access point 130a. Similarly, it is assumed that a radio wave from the access point 130b is blocked by a structure B2, causing shadowing in a section from points P11 to P12 of the track P, so that it is not possible to perform communication connection with the access point 130b.

In the present embodiment, for the purpose of preventing the complication of description, a configuration in which the mobile communication system 100 includes one wireless LAN terminal 110 will be described. However, the mobile communication system 100 may also include a plurality of wireless LAN terminals 110.

Figure 2:
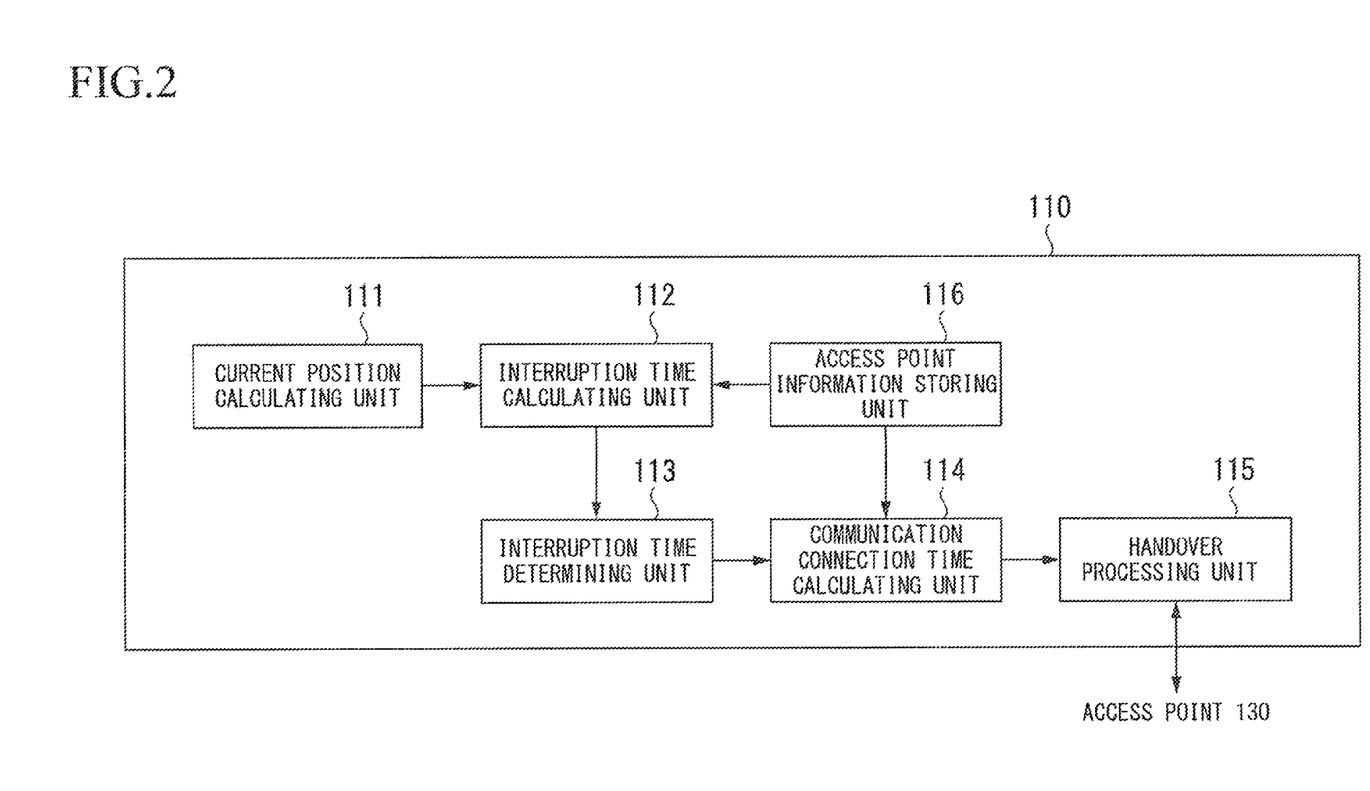
FIG. 2 is a block diagram showing one example of a configuration of a wireless LAN terminal 110.

FIG. 2 shows one example of a block configuration of the wireless LAN terminal 110. The wireless LAN terminal 110 includes a current position calculating unit 111, an interruption time calculating unit 112, an interruption time determining unit 113, a communication connection time calculating unit 114, a handover processing unit 115, and an access point information storing unit 116. In the following description, the function and the operation of each element will be described in detail.

The current position calculating unit 111 calculates a current position of the train T on the track P.

The interruption time calculating unit 112 calculates an interruption time, in which communication with a currently communication-connected access point 130 is interrupted, for a travel direction side of the track P more forward than the current position of the train T. In more detail, the interruption time calculating unit 112 calculates the interruption time, in which communication with the currently communication-connected access point 130 is interrupted, for the travel direction side of the track P more forward than the current position calculated by the current position calculating unit 111.

The interruption time determining unit 113 determines whether the interruption time, in which communication with the currently communication-connected access point 130 is interrupted, is within a predetermined permissible time range for the travel direction side of the track P more forward than the current position of the train T. In more detail, the interruption time determining unit 113 determines whether the interruption time calculated by the interruption time calculating unit 112 is within the predetermined permissible time range.

The communication connection time calculating unit 114 calculates respective communication connection times, for which communication connection can be continued in the case of handover, with respect to one or more access points 130 which is capable of performing handover.

The handover processing unit 115 performs handover processing when the interruption time determining unit 113 determines that the interruption time is not within the permissible time range. In more detail, the handover processing unit 115 performs the handover processing for an access point 130 having the longest communication connection time calculated by the communication connection time calculating unit 114 among the one or more access points 130 which is capable of performing handover.

The access point information storing unit 116 stores information on the access point 130.

Figure 3:
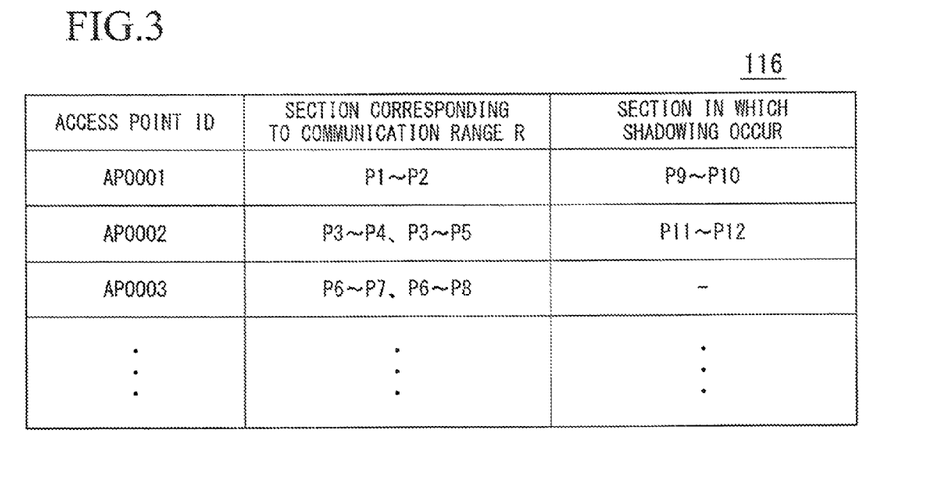
FIG. 3 is a diagram showing one example of information, which is stored in an access point information storing unit 116, in a table form.

FIG. 3 shows one example of information, which is stored in the access point information storing unit 116, in a table form. In the access point information storing unit 116, information on access point IDs (identifiers), sections corresponding to a communication range R, and sections, in which shadowing occurs, is associated and stored.

The information on the access point IDs is an identifier for uniquely identifying each access point 130 among a plurality of access points 130. The information on the sections corresponding to the communication range R is information indicating sections of the track P, which correspond to the communication range R of the access point 130 identified by the access point ID. The information on the sections in which shadowing occurs is information indicating sections, in which shadowing occurs, among the sections of the track P shown by the information on the sections corresponding to the communication range R.

In the following description, an access point 130 identified by an access point ID "AP0001" is set as the access point 130a, an access point 130 identified by an access point ID "AP0002" is set as the access point 130b, and an access point 130 identified by an access point ID "AP0003" is set as the access point 130c.

Figure 4:
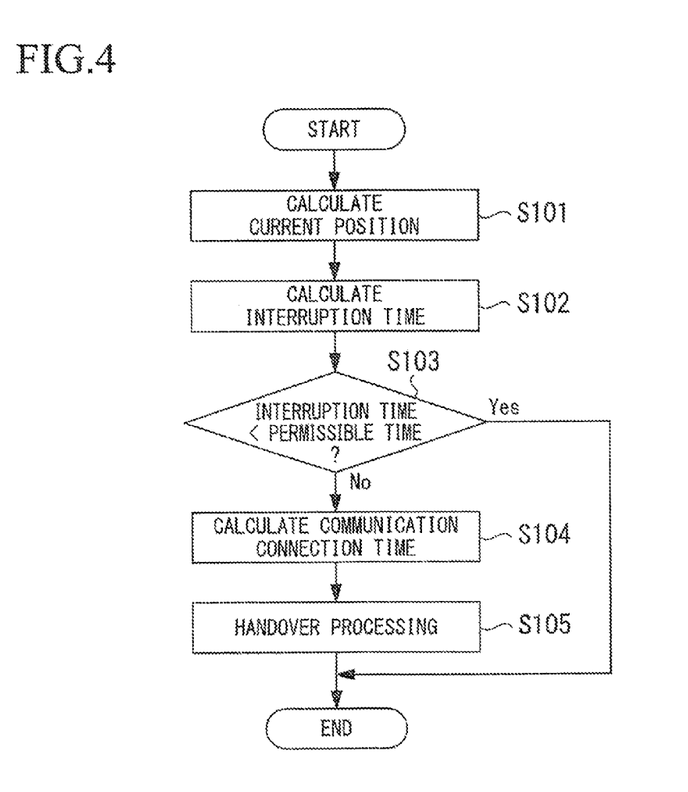
FIG. 4 is a diagram showing one example of an operation flow of a wireless LAN terminal 110.

FIG. 4 shows one example of an operation flow of the wireless LAN terminal 110. In the description of the operation flow, a process when the wireless LAN terminal 110 performs handover will be described in detail. In the description of the operation flow, FIG. 1 to FIG. 3 will be commonly referred to.

Hereinafter, the case in which the train T exists at a point Px on the track P will be described as an example. Hereinafter, the case in which the train T moves from the station A to the station B will be described as an example.

First, the current position calculating unit 111 of the wireless LAN terminal 110 calculates a current position of the train T on the track P (S101). For example, on the basis of signals indicating positions on the track P, which are transmitted from ground units provided along the track P, the current position calculating unit 111 calculates the current position of the train T on the track P. For example, the current position calculating unit 111 measures a travelled distance from the number of revolutions of an axle, thereby calculating the current position of the train T on the track P. For example, on the basis of the electric field intensity of each access point 130, the current position calculating unit 111 calculates the current position of the train T on the track P. For example, on the basis of GPS (global positioning system) positioning information, the current position calculating unit 111 calculates the current position of the train T on the track P. In the case of the example, the current position calculating unit 111 calculates the point Px of the track P as the current position of the train T on the track P. The current position calculating unit 111 transmits data indicating the current position calculated as above to the interruption time calculating unit 112.

When the data transmitted from the current position calculating unit 111 is received, the interruption time calculating unit 112 of the wireless LAN terminal 110 calculates an interruption time, in which communication with a currently communication-connected access point 130 is interrupted, for a travel direction side of the track P more forward than the current position of the train T indicated by the data (S102). For example, the interruption time calculating unit 112 calculates the interruption time, in which communication with the currently communication-connected access point 130 is interrupted, in the closest section in which shadowing occurs, for the travel direction side of the track P more forward than the current position of the train T. In the case of the example, the wireless LAN terminal 110 communicates with the access point 130a at the current position Px of the train T. Consequently, the interruption time calculating unit 112 reads the information for the section "P9 to P10" in which shadowing occurs, which has been associated with the information in the access point ID "AP0001" column and stored among the information stored in the access point information storing unit 116. The interruption time calculating unit 112 calculates a distance from the point P9 to the point P10 of the track P. On the basis of the distance of the section from the point P9 to the point P10 of the track P and a travel speed of the train T planned with respect to the section, the interruption time calculating unit 112 calculates a time required for passing through the section, and sets the time as an interruption time in which communication with the access point 130a is interrupted. The interruption time calculating unit 112 transmits, to the interruption time determining unit 113, data indicating the interruption time calculated as above and the information on the section in which shadowing occurs, which has been read from the access point information storing unit 116.

When the data transmitted from the interruption time calculating unit 112 is received, the interruption time determining unit 113 of the wireless LAN terminal 110 determines whether the interruption time indicated by the data is within a predetermined permissible time range (S103). For example, the permissible time is appropriately decided by the content of data communication. That is, in the case of assuming data communication in which a real-time property is important, the permissible time is set to be short. On the other hand, in the case of assuming data communication in which the real-time property is not important, the permissible time may be set to be long. When it is determined that the interruption time is not within the predetermined permissible time range (S103: No), the interruption time determining unit 113 transmits the data, indicating the information on the section in which shadowing occurs, to the communication connection time calculating unit 114, which is indicated by the data received from the interruption time calculating unit 112.

When the data transmitted from the interruption time determining unit 113 is received, the communication connection time calculating unit 114 of the wireless LAN terminal 110 calculates respective communication connection times, for which communication connection can be continued in the case of handover, with respect to one or more access points 130 which is capable of performing handover (S104). For example, on the basis of the information stored in the access point information storing unit 116, the communication connection time calculating unit 114 specifies the one or more access points 130 which is capable of performing handover, until the train T reaches a start point of the section in which shadowing occurs, which is indicated by the data received from the interruption time determining unit 113. In the case of the example, when referring to the information on the sections corresponding to the communication range R stored in the access point information storing unit 116, it can be understood that the access points 130, which is capable of performing handover until the train T reaches the point P9 serving as the start point of the section in which shadowing occurs, are the access point 130b identified by the information in the access point ID "A0002" column and the access point 130c identified by the information in the access point ID 003" column. Consequently, the communication connection time calculating unit 114 calculates respective communication connection times, for which communication connection can be continued in the case of handover, with respect to the access point 130b and the access point 130c. For example, when the wireless LAN terminal 110 has been handed over to the access point 130, if the section in which shadowing occurs exists in the sections corresponding to the communication range R of the access point 130, the communication connection time calculating unit 114 calculates a time required for passing through a communicable section on the basis of a distance of the communicable section up to the section and the travel speed of the train T planned with respect to the communicable section, and sets the time as the communication connection time for which communication connection can be continued in the case of handover. In the case of the example, when referring to the information on sections corresponding to the communication range R stored in the access point information storing unit 116, it can be understood that a communicable section when the wireless LAN terminal 110 has been handed over to the access point 130b is a section from the point P3 to the point P11 of the track P. Similarly, it can be understood that a communicable section when the wireless LAN terminal 110 has been handed over to the access point 130c is a section from the point P6 to the point P7 of the track P. The communication connection time calculating unit 114 transmits, to the handover processing unit 115, data indicating information on the access point ID of an access point 130 having the longest communication connection time calculated as above.

When the data transmitted from the communication connection time calculating unit 114 is received, the handover processing unit 115 of the wireless LAN terminal 110 performs handover processing for the access point 130 identified by information on an access point ID indicated by the data (S105). The current position of the train T is not limited to within the communication range R of an access point 130 which is capable of performing handover. If the current position of the train T is not within the communication range R of the access point 130 which is capable of performing handover, the handover processing unit 115 may not be immediately handed over to the access point 130 at the current position of the train T. In that case, when the train T moves and enters within the communication range R of the access point 130 which is capable of performing handover, the handover processing unit 115 transmits a connection request to the access point 130, thereby performing handover processing. For example, when the wireless LAN terminal 110 is handed over from the access point 130a to the access point 130b, the handover processing unit 115 performs handover processing when the train T has passed through the point P3 of the track P.

On the other hand, in the process of step S103, when it is determined that the interruption time is within the predetermined permissible time range, the interruption time determining unit 113 does not perform any processings. That is, in that case, the wireless LAN terminal 110 does not perform handover processing.

In the present embodiment, an embodiment in which the information indicated in the table form as shown in FIG. 3 is stored in the access point information storing unit 116, has been described. In other embodiments, an embodiment, in which information on a digital map is stored in the access point information storing unit 116, is considered. In that case, for example, on the digital map, position information of the track P, position information of the access point 130, and position information of the structure B, which may be a factor causing shadowing, are defined.

So far, as described above, the mobile communication system 100 includes the wireless LAN terminal 110 provided in the train T moving along the track P. The mobile communication system 100 includes the plurality of access points 130 provided along the track P. The wireless LAN terminal 110 determines whether the interruption time, in which communication with the currently communication-connected access point 130 is interrupted, is within the predetermined permissible time range for the travel direction side of the track P more forward than the current position of the train T. When it is determined that the interruption time is not within the permissible time range, the wireless LAN terminal 110 performs handover processing.

In this way, according to the mobile communication system 100, when communication interruption beyond the permissible time range is assumed regardless of a communication state with the connected access point 130, it is possible to perform handover processing at an appropriate timing.

As described above, the wireless LAN terminal 110 calculates the interruption time, in which communication with the currently communication-connected access point 130 is interrupted, for the travel direction side of the track P more forward than the current position of the train T. The wireless LAN terminal 110 determines whether the calculated interruption time is within the predetermined permissible time range.

In this way, according to the mobile communication system 100, for example, since the interruption time is calculated in response to the planned travel speed of the train T, even though the planned travel speed of the train T is changed, it is possible to flexibly cope with the change.

As described above, the wireless LAN terminal 110 calculates the current position of the train T on the track P. The wireless LAN terminal 110 calculates the interruption time, in which communication with the currently communication-connected access point 130 is interrupted, for the travel direction side of the track P more forward than the calculated current position.

In this way, according to the mobile communication system 100, it is possible to precisely detect the current position of the train T, and to reliably perform handover processing in advance of a section in which shadowing occurs.

As described above, the wireless LAN terminal 110 calculates the respective communication connection times, for which communication connection can be continued in the case of handover, with respect to the one or more access points 130 which is capable of performing handover. The wireless LAN terminal 110 performs handover processing for the access point 130 having the calculated longest communication connection time.

In this way, according to the mobile communication system 100, the communication connection time with the access point 130 after the handover can be longest, so that it is possible to reduce the number of times of handover.

Figure 5:
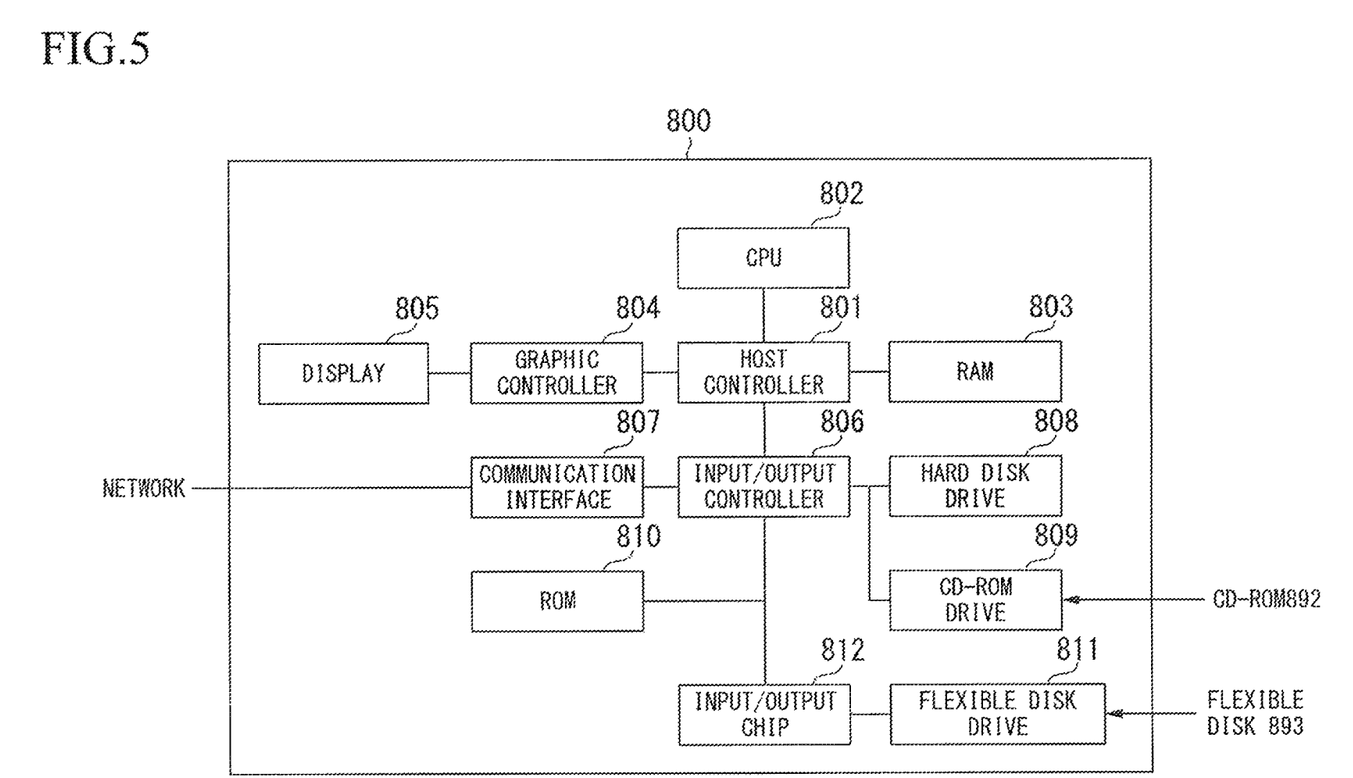
FIG. 5 is a diagram showing one example of a hardware configuration of a computer 800 constituting a wireless LAN terminal 110 according to the present embodiment.

FIG. 5 shows one example of a hardware configuration of a computer 800 constituting the wireless LAN terminal 110 according to the present embodiment. The computer 800 according to the present embodiment includes a CPU peripheral unit having a CPU (central processing unit) 802, a RAM (random access memory) 803, a graphic controller 804 and a display 805 connected with one another by a host controller 801, an input/output unit having a communication interface 807, a hard disk drive 808 and a CD-ROM (compact disk read only memory) drive 809 connected with one another by an input/output controller 806, and a legacy input/output unit having a ROM (read only memory) 810, a flexible disk drive 811, and an input/output chip 812 connected to the input/output controller 806.

The host controller 801 connects the RAM 803, the CPU 802 accessing the RAM 803 at a high transmission rate, and the graphic controller 804 to one another. The CPU 802 operates on the basis of programs stored in the ROM 810 and the RAM 803, and controls each element. The graphic controller 804 acquires image data generated by the CPU 802 and the like on a frame buffer provided in the RAM 803, and displays the image data on the display 805. Alternatively, the graphic controller 804 may include the frame buffer, which stores the image data generated by the CPU 802 and the like, therein.

The input/output controller 806 connects the host controller 801, the communication interface 807 serving as a relatively high speed input/output device, the hard disk drive 808, and the CD-ROM drive 809 to one another. The hard disk drive 808 stores programs and data used by the CPU 802 in the computer 800. The CD-ROM drive 809 reads programs and data from a CD-ROM 892 and provides the programs and the data to the hard disk drive 808 via the RAM 803.

The ROM 810, and the flexible disk drive 811 and the input/output chip 812 serving as relatively low speed input/output devices are connected to the input/output controller 806. The ROM 810 stores a boot program to be executed when the computer 800 starts to operate, and/or programs and the like depending on the hardware of the computer 800. The flexible disk drive 811 reads programs or data from a flexible disk 893 and provides the programs or the data to the hard disk drive 808 via the RAM 803. The input/output chip 812 connects the flexible disk drive 811 to the input/output controller 806, and for example, connects various types of input/output devices to the input/output controller 806 via parallel ports, serial ports, a keyboard port, a mouse port and the like.

The programs provided in the hard disk drive 808 via the RAM 803 are stored in a recording medium such as the flexible disk 893, the CD-ROM 892, or an IC (integrated circuit) card, and are provided by a user. The programs are read from the recording medium, are installed in the hard disk drive 808 in the computer 800 via the RAM 803, and are executed in the CPU 802.

The program, which is installed in the computer 800 and causes the computer. 800 to serve as the wireless LAN terminal 110, causes the computer 800 to serve as the interruption time determining unit 113, which determines whether the interruption time, in which communication with the currently communication-connected access point 130 is interrupted, is within the predetermined permissible time range for the travel direction side of the track P more forward than the current position of the train T in step S103, and to serve as the handover processing unit 115 that performs the handover processing in step S105 when the interruption time determining unit 113 determines that the interruption time is not within the permissible time range.

The program may also cause the computer 800 to serve as the interruption time calculating unit 112, which calculates the interruption time, in which communication with the currently communication-connected access point 130 is interrupted for the travel direction side of the track P more forward than the current position of the train T in step S102, and to serve as the interruption time determining unit 113 that determines whether the interruption time calculated by the interruption time calculating unit 112 is within the predetermined permissible time in step S103.

The program may also cause the computer 800 to serve as the current position calculating unit 111, which calculates the current position of the train T on the track P, and to serve as the interruption time calculating unit 112 that calculates the interruption time, in which communication with the currently communication-connected access point 130 is interrupted for the travel direction side of the track P more forward than the current position calculated by the current position calculating unit 111, in step S102.

The program may also cause the computer 800 to serve as the communication connection time calculating unit 114, which calculates the respective communication connection times, for which communication connection can be continued in the case of handover, with respect to the one or more access points 130 which is capable of performing handover in step S104, and to serve as the handover processing unit 115 that performs handover processing for an access point 130 having the longest communication connection time calculated by the communication connection time calculating unit 114, among the one or more access points 130 which is capable of performing handover, in step S105.

The information processing described in these programs is read in the computer 800, and thus serves as the current position calculating unit 111, the interruption time calculating unit 112, the interruption time determining unit 113, the communication connection time calculating unit 114, the handover processing unit 115, and the access point information storing unit 116 that are detailed means in which software and the aforementioned various hardware resources have cooperated with each other. By these detailed means, the operation or processing of information corresponding to the use purpose of the computer 800 in the present embodiment is realized, so that the specific wireless LAN terminal 110 corresponding to the use purpose is constructed.

As one example, in the case of performing communication between the computer 800 and an external device and the like, the CPU 802 executes a communication program loaded on the RAM 803, and instructs a communication process to the communication interface 807 on the basis of processing content described in the communication program. Under the control of the CPU 802, the communication interface 807 reads transmission data stored in a transmission buffer area and the like provided on a storage device, such as the RAM 803, the hard disk drive 808, the flexible disk 893, or the CD-ROM 892, and transmits the transmission data to a network, or writes reception data received from the network in a reception buffer area and the like provided on the storage device. As described above, the communication interface 807 may also transmit the transmission/reception data to the storage device by a direct memory access method, or alternatively, the CPU 802 may read data from the storage device serving as a transmission source or the communication interface 807, and write the data in the communication interface 807 serving as a transmission destination or the storage device, so that the transmission/reception data may be transmitted.

The CPU 802 allows the whole or a necessary part of files, a data base and the like, which are stored in an external storage device such as the hard disk drive 808, the CD-ROM 892, or the flexible disk 893, to be read in the RAM 803 by direct memory access transmission and the like, and performs various types of processing of data in the RAM 803. The CPU 802 writes processed data back to the external storage device by the direct memory access transmission and the like.

In such processing, since the RAM 803 is regarded to temporarily hold the content of the external storage device, the RAM 803, the external storage device and the like are generically called a memory, a storage unit, a storage device and the like in the present embodiment. In the present embodiment, various pieces of information in various types of programs, data, tables, data bases and the like are stored on such a storage device and are subjected to information processing. The CPU 802 can hold a part of the RAM 803 in a cache memory and perform reading and writing on the cache memory. Even in such a form, since the cache memory takes charge of a part of the functions of the RAM 803, the cache memory is assumed to be included in the RAM 803, a memory, and/or a storage device, except that the cache memory is shown as distinct in the present embodiment.

The CPU 802 performs various types of processing, which is designated by a command string of a program and includes various types of operations, information processing, condition determination, information retrieval, replacement and the like described in the present embodiment, with respect to the data read from the RAM 803, and writes the processed data back to the RAM 803. For example, in the case of performing the condition determination, the CPU 802 determines whether various variables in the present embodiment satisfy conditions such as large, small, equal to or more than, equal to or less than, or equal as compared with other variables or constants, and diverts the command string to a different command string or calls a sub-routine when the conditions are satisfied or not.

The CPU 802 can retrieve information stored in the files, the database and the like in the storage device. For example, when a plurality of entries, in which respective attribute values of a second attribute have been associated with attribute values of a first attribute, are stored in the storage device, the CPU 802 can retrieve an entry coinciding with a condition in which the attribute values of the first attribute have been designated from among the plurality of entries stored in the storage device, and reads attribute values of a second attribute stored in the entry, so that it is possible to obtain attribute values of a second attribute, which satisfy predetermined conditions and have been associated with the first attribute.

The aforementioned program or module may also be stored in the external storage device. As the storage device, in addition to the flexible disk 893 and the CD-ROM 892, an optical recording medium such as DVD (digital versatile disk) or CD (compact disk), a magneto-optical recording medium such as MO (magneto-optical disk), a tape medium, a semiconductor memory such as an IC card, and the like are available. A hard disk provided in a server system connected to a dedicated communication network or the Internet, or a storage medium such as a RAM may be used as a storage medium, so that programs may be provided in the computer 800 via the network.

While the present invention has been described using the embodiment, the technical range of the present invention is not limited to the range described in the embodiment. It is apparent to those skilled in the art that various changes or improvements can be made in the embodiment. It is apparent from the appended claims that the embodiment thus changed or improved can also be included in the technical range of the present invention.

It should be noted that an execution order of each process of an operation, a procedure, a step, a stage and the like in a system, a method, an apparatus, a program, and a recording medium described in the claims, the specification, and the drawings is not specifically identified through the use of special "before", "prior to" and the like, and can be realized in any order as long as the output of a previous process is not used by a subsequent process. One must note that, even if an operation flow in the claims, the specification, and the drawings is described with the use of "first", "next" and the like for convenience, it does not mean that the operation flow is necessarily to be implemented in that order.

INDUSTRIAL APPLICABILITY

As apparent from the above description, according to the aforementioned aspects, when communication interruption beyond the permissible time is assumed regardless of a communication state with a connected base station, it is possible to perform handover processing at an appropriate timing.

The invention claimed is:

1. A mobile communication system in which a mobile station moves while performing handover, the mobile communication system comprising:
   the mobile station provided in a moving object moving along a predetermined route; and
   a plurality of base stations provided along the predetermined route,
   wherein the mobile station comprises:
      an access point information storing unit in which information of sections of the predetermined route in which shadowing occurs is stored;
      an interruption time determining unit configured to determine whether an interruption time, in which the base station communicating with the mobile station which is currently connected is interrupted communication with the mobile station, is within a predetermined permissible time range for a travel direction side of the predetermined route more forward than a current position of the moving object based on the information stored in the access point information storing unit; and
      a handover processing unit configured to perform handover processing when the interruption time determining unit determines that the interruption time is not within the permissible time range.

2. The mobile communication system according to claim 1, wherein the mobile station comprises:
   an interruption time calculating unit configured to calculate the interruption time, in which the base station communicating with the mobile station which is currently connected is interrupted communication with the mobile station, for the travel direction side of the predetermined route more forward than the current position of the moving object,
   wherein the interruption time determining unit determines whether the interruption time calculated by the interruption time calculating unit is within the predetermined permissible time range.

3. The mobile communication system according to claim 2, wherein the mobile station comprises:
   a current position calculating unit configured to calculate the current position of the moving object in the predetermined route,
   wherein the interruption time calculating unit calculates the interruption time, in which the base station communicating with the mobile station which is currently connected is interrupted communication with the mobile station, for the travel direction side of the predetermined route more forward than the current position calculated by the current position calculating unit.

4. The mobile communication system according to claim 1, wherein the mobile station comprises:
   a communication connection time calculating unit configured to calculate respective communication connection times, for which communication connection is continued when being performed handover, with respect to one or more base stations which is capable of performing handover,
   wherein the handover processing unit performs handover processing for an base station having a longest communication connection time calculated by the communication connection time calculating unit among the one or more base stations which is capable of performing handover.

5. The mobile communication system according to claim 1, wherein the handover processing unit configured to perform the handover processing immediately in the case that the current position of the moving object is within a communication range of the base station which is capable of performing handover and perform the handover processing when the mobile station enters within the communication range of the base station which is capable of performing handover in the case that the current position of the moving object is not within the communication range of the base station.

6. A mobile communication method in which a mobile station moves along a predetermined route while performing handover, the mobile communication method comprising:
   an access point information storing step in which information of sections of the predetermined route in which shadowing occurs is stored;
   an interruption time determining step that the mobile station provided in a moving object moving along the predetermined route determines whether an interruption time, in which a base station communicating with the mobile station which is a currently connected among a plurality of base stations provided along the predetermined route is interrupted communication with the mobile station, is within a predetermined permissible time range for a travel direction side of the predetermined route more forward than a current position of the moving object based on the information stored in the access point information storing unit; and a handover processing step of performing handover processing when it is determined in the interruption time determining step that the interruption time is not within the permissible time range.

7. A mobile station provided in a moving object moving along a predetermined route, the mobile station comprising:

an access point information storing unit in which information of sections of the predetermined route in which shadowing occurs is stored;

an interruption time determining unit configured to determine whether an interruption time, in which a base station communicating with the mobile station which is currently connected among a plurality of base stations provided along the predetermined route is interrupted communication with the mobile station, is within a predetermined permissible time range for a travel direction side of the predetermined route more forward than a current position of the moving object based on the information stored in the access point information storing unit; and a handover processing unit configured to perform handover processing when the interruption time determining unit determines that the interruption time is not within the permissible time range.

8. A non-transitory recording medium, which records a program that causes a computer to serve as a mobile station provided in a moving object moving along a predetermined route, records the program that causes the computer to serve as an access point information storing unit in which information of sections of the route in which shadowing occurs is stored;

an interruption time determining unit that determines whether an interruption time, in which a base station communicating with the mobile station which is currently connected among a plurality of base stations provided along the predetermined route is interrupted communication with the mobile station, is within a predetermined permissible time range for a travel direction side of the predetermined route more forward than a current position of the moving object based on the information stored in the access point information storing unit, and a handover processing unit that performs handover processing when the interruption time determining unit determines that the interruption time is not within the permissible time range.

* * * * *